Feb. 7, 1928.
S. E. KURTZ
1,658,344
FLEXIBLE BELT POWER TAKE-OFF
Filed Sept. 7, 1926 2 Sheets-Sheet 1
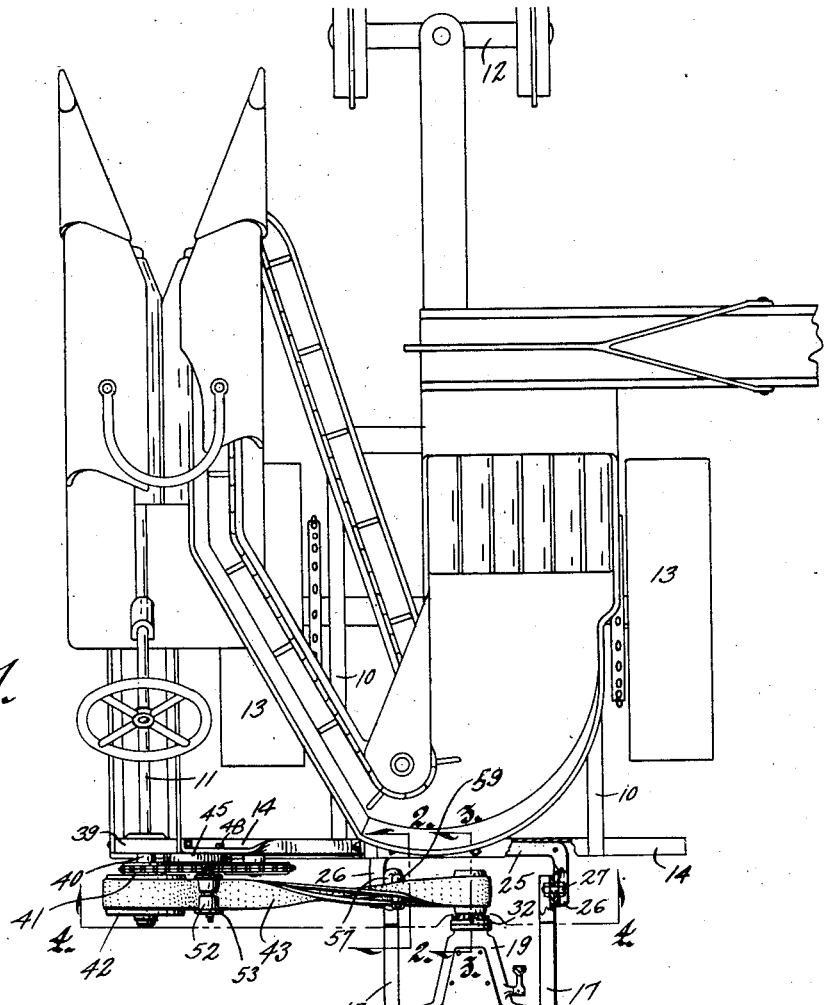
Fig.1.
Fig.2.
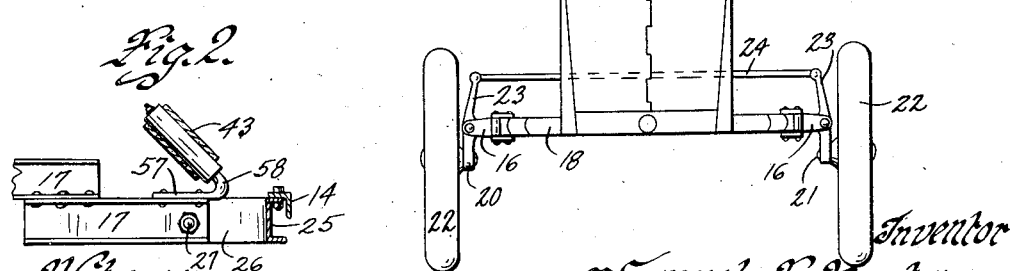
Witness
Inventor
Samuel E. Kurtz
by Bair & Freeman Attorneys Feb. 7, 1928.

S. E. KURTZ 1,658,344

FLEXIBLE BELT POWER TAKE-OFF

Filed Sept. 7, 1926   2 Sheets-Sheet 2

Witness
Ray Rusher

Inventor
Samuel E. Kurtz
by Bair & Freeman Attorneys

Patented Feb. 7, 1928.

1,658,344

UNITED STATES PATENT OFFICE.

SAMUEL E. KURTZ, OF SAC CITY, IOWA.

FLEXIBLE BELT POWER TAKE-OFF.

Application filed September 7, 1926. Serial No. 133,766.

The object of my invention is to provide a flexible belt power take-off of simple, durable and inexpensive construction.

More particularly, it is my object to provide such a take-off, peculiarly adapted for taking power from a wheel-mounted power plant pivotally connected to the frame of another machine or vehicle for operating the mechanism of such machine or vehicle.

In this connection, one of the special purposes of my invention is to provide a simple and convenient means for holding the belt in place regardless of pivotal movement of the frames of the power plant and other vehicle or machine and reduce friction of the belt.

Still another purpose of the present invention is to provide a belt pulley and suitable mounting therefor adapted to be connected with a power plant, such as that of an ordinary Ford car.

Still another object is to provide a belt pulley structure for connection to the operating shaft of a machine, such for example as a corn picker.

A further object of the present invention is to provide the combination of a machine, such as a corn picker with a power plant, such for instance as that of the Ford automobile, and to provide convenient, simple and inexpensive means for connecting them together.

With these and other objects in view, my invention consists in the construction, arrangement and combination of the various parts of my flexible belt power take-off, whereby the objects contemplated are attained, as hereinafter more fully set forth, pointed out in my claims, and illustrated in the accompanying drawings, in which:

Figure 1 is a top or plan view of a flexible belt power take-off embodying my invention shown installed in connection with a Ford power plant and a corn picker.

Figure 2 is a detail, sectional view taken on the line 2—2 of Figure 1.

Figure 5:
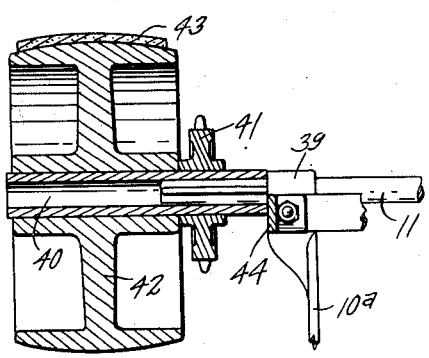
Figure 5 is a sectional view taken on the line 5—5 of Figure 4.
Figure 6:
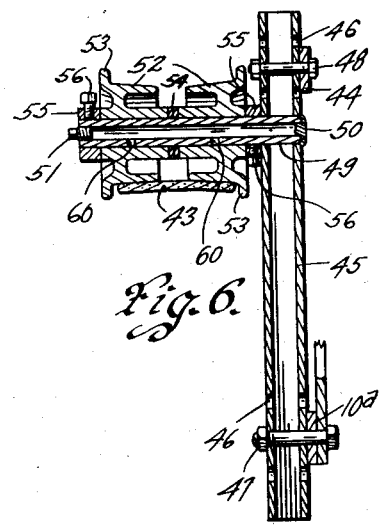
Figure 6 is a sectional view taken on the line 6—6 of Figure 4.

In the accompanying drawings, I have used the reference numeral 10 to indicate generally the frame of a machine, such for example as a corn picker, having the usual operating mechanism, including the main operating shaft 11. The corn picker has the front truck structure 12 and the large supporting wheels 13. The frame of the corn picker includes the rear, transverse frame member 14, which as here illustrated is in the form of an angle bar.

It is my purpose to provide a flexible belt power take-off whereby the shaft 11 may be operated from a power plant hitched behind a corn picker as a trailer. The power plant illustrated in the present instance is a Ford automobile engine mounted on the ordinary front wheels with the frame cut in two transversely just rearwardly of the gear casing.

I have shown the Ford engine 15 supported on the front axle 16 by means of the longitudinal, side frame members 17 and the front spring 18. The frame members 17 are cut off substantially flush with the rear end of the gear casing 19.

In arranging the Ford engine for a trailer to follow the other machine, such as the corn picker, the front wheel spindles are disconnected from the ends of the axle, and I provide short, rearwardly extending arms 20 pivoted to the ends of the axle, and having the ordinary spindles 21 journaled in them rearwardly from the axle.

It will be understood that the Ford engine assembly when drawn as a trailer is drawn rearwardly with relation to its usual travel, but forwardly with relation to the travel of the corn picker. By thus offsetting the front wheels of the Ford structure rearwardly (with relation to the entire combination machine) and removing the usual drag link connection and hand steering mechanism these wheels become castor wheels 22.

The arms 20 have forwardly extending portions 23, which are connected by the usual tie rod 24. Bolted to the transverse rear frame member 14 of the corn picker is a central portion 25 of a U-shaped bracket, having the rearwardly extending arms 26, which are pivoted to the rear ends of the frame members 17 by means of the bolts 27 to permit relative movements of the frames of the power plant and the corn picker.

The power plant will thus be drawn behind the corn picker as a trailer. The corn picker may be pulled by a tractor or draft animals or as may be desired.

It will, of course, be understood that I have used the Ford power plant and corn picker simply as illustrations of environments in which my flexible belt power take-off may be employed.

I have taken off the usual universal joint housing from the rear end of the gear casing 19 of a Ford car.

Figure 3:
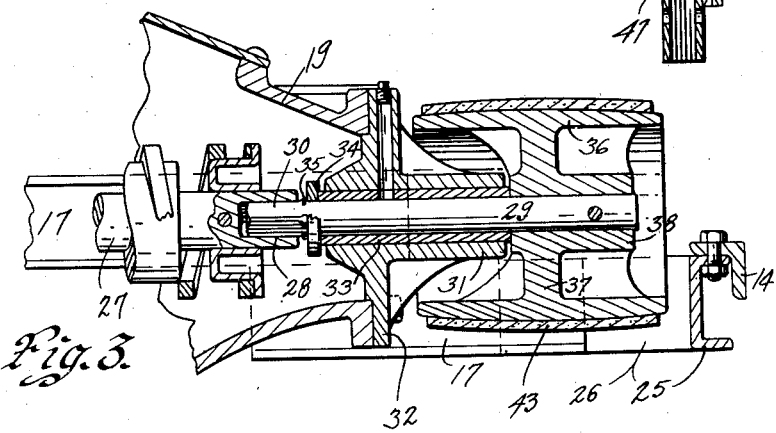
Figure 3 is a sectional view taken on the line 3—3 of Figure 1.

In Figure 3, I have shown the belt pulley assembly which is connected with the Ford shaft 27ª leading from the gear casing. This shaft is provided with a socket 28. I provide for connection with the shaft 27ª a shaft 29 having a squared end 30 received in the socket 28, which is angular in cross section.

The shaft 29 has mounted on it a sleeve 31 on which is formed a cover plate 32 for the rear end of the gear casing 19. The plate 32 is bolted to the rear end of the gear casing.

Between the sleeve 31 and the shaft 29 is a bronze bushing or the like 33. I prefer to cast the sleeve 31 and plate 32 around the bushing 33. At the rear end of the bushing 33, a washer 34 is mounted on the shaft 29 and is locked adjacent to the bushing 33 in any suitable way as by lugs 35 formed on the shaft.

The shaft 29 projects forwardly in the assembled mechanism from the sleeve 31 and has mounted on it a belt pulley 36 having the web 37 and the hub or sleeve 38, which extends substantially forwardly from the web, but only a short distance rearwardly therefrom, so that the rearward portion of the belt pulley 36 overlaps the forward portion of the sleeve 31, as shown.

The sleeve 38 is suitably fixed to the rear end of the shaft 29.

For transmitting power from the belt pulley 36 to the shaft 11, hereinbefore referred to, I provide the following means:

The rear end of the shaft 11 is mounted in a bearing 39 illustrated in Figures 1 and 5 and projects rearwardly therefrom.

I mount on the rearwardly projecting end of the shaft 11 a sleeve 40, which is fixed in any suitable way to the shaft 11. Fixed on the sleeve 40 adjacent to the bearing 39 is a sprocket wheel 41 from which power is conveyed to the various parts of the power mechanism.

On the sleeve 40 is fixed a belt pulley 42.

The bearing 39 may be bored to permit the sleeve 40 to be projected through it if desired.

Mounted on the pulleys 36 and 42 is a belt 43, which is crossed between the pulleys, as shown in the drawings.

Figure 4:
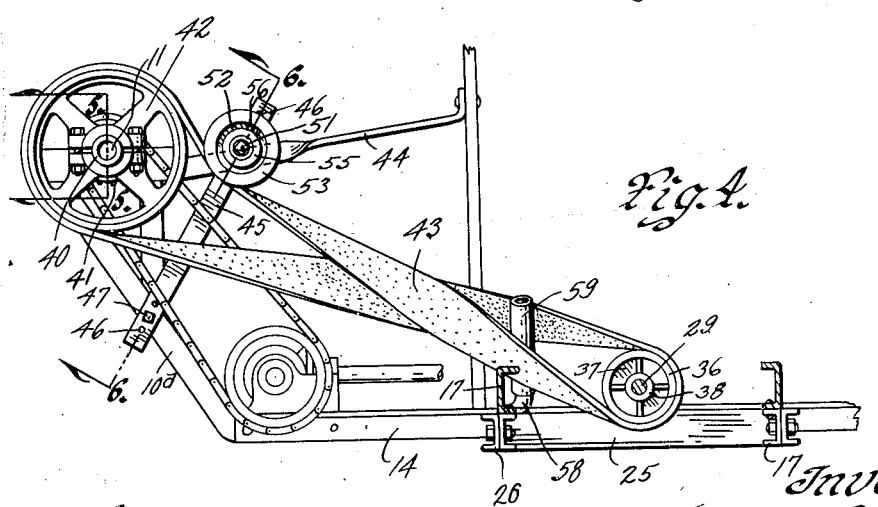
Figure 4 is a detail, sectional view taken on the line 4—4 of Figure 1.

I provide a belt tightener, which is mounted in the following manner:

A brace 44 is supported on the frame of the corn picker as shown for instance in Figures 1 and 4.

A hollow tube 45 is provided with a plurality of holes 46 near each end. A bolt 47 is used to secure the lower end of the tube 45 to the portion 10ª of the power frame and a bolt 48 fastens the upper end of the tube 45 to the brace 44.

Journaled in the walls of the tube 45 is a tubular spindle 49, having at one end a plug 50 and at the other end a removable plug 51, the latter being provided so that it may be removed for furnishing lubricant to the interior of the spindle 49.

On the spindle 49 is mounted a belt tightener pulley, comprising a pair of annular pulley members 52, each having one external flange 53. A washer 54 is provided between the hubs of the pulley members 52.

On each side of the pulley members 52 on the tubular spindle 49 is mounted a collar 55 held in place by set screws 56.

The parts just described are so constructed and mounted that the two-part pulley composed of the members 52 engages the belt 43 and serves as a tightener.

One problem, which is involved in a device of this kind, arises from the pivotal connection of the frames of the two machines. This pivotal connection is desirable in order that the machines may travel over surfaces of the ground where inequalities exist.

I find, however, that where the trailer rocks up and down somewhat with relation to the frame of the corn picker, belt 43 tends to shift on the pulley 36. In order therefore to prevent undue shifting of this kind and also to hold the belt against friction between its stretches, I have provided the following device:

Supported on the rear end of the left-hand frame member 17, as shown in Figures 1 and 2, is a bracket 57, which has an upwardly and rearwardly inclined portion 58 on which is mounted a suitable roller 59. The roller 59 is inclined as shown at approximately an angle of forty-five degrees from vertical and extends between the stretches of the belt 43, as shown in Figures 1 and 2 and 4. It should be inclined to correspond to the stretches of the belt at the point where it is used.

The roller 59 thus holds the strips of the belt apart and limits the friction between the cross portions of the belt and also serves to hold the belt in place against forward and rearward shifting on the pulleys.

I have thus provided a flexible belt take-off by which power may be taken from one machine or vehicle and conveyed to another. The device is peculiarly adapted for taking power from a trailing power plant and conducting it to a machine, such for instance as the corn picker here illustrated.

I have shown the take-off structure illustrated in connection with a Ford engine mounted on the usual Ford front axle with the Ford front wheels re-arranged, so as to act as castor wheels.

It might be said in this connection that the front portion of a Ford here illustrated together with the pulley 36 in its assembly may be used as a portable power plant to be moved to various power demands by providing wheelbarrow legs and handles detachably connected with the frame members 17.

The portable power plant made of an old Ford with its frame cut amidships can then be used in connection with the pulley 42 or with any other suitable pulley for operating a great variety of machinery.

One of the advantageous features of the structure herein shown is seen in the pulley assembly illustrated in Figure 3 in which the bearing for the shaft 29 projects into the pulley, thus eliminating the necessity for an extra outside bearing for such shaft.

The pulley 36 in its assembly including the shaft 29, sleeve 31 and cover plate 32 may be constructed and sold as a unit and is easily and readily mounted on the Ford gear casing.

Another advantageous feature of structure is found in the pulley assembly shown in Figure 5. I have here provided a sleeve or tubular shaft 40 mounted on the usual shaft 11 and carrying the sprocket 41 and pulley 42. The sprocket 41 may be the usual sprocket provided on corn pickers re-bored for mounting on the tubular shaft 40.

All that is necessary to mount this assembly on the ordinary corn picker is to key the tubular shaft 40 to the usual shaft 11 and to provide the pulley 42 and the sprocket 41 with its enlarged bore.

Another feature of construction, which I consider of importance in the present device is found in the belt tightener. The tubular member 45 is adjustable by setting the bolts 47 and 48 in different holes 46. The whole device is quickly attachable and detachable. The belt tightener consisting of the two single flanged pulleys with a washer between them affords a belt tightener, which can be made of greater or less width to fit different belts by varying the thickness of the washer 54 and adjusting the collar 55 on the spindle 49.

Such a tightener, will, of course, help prevent the belt from running off the pulley 42 if the tightener pulley is located near the pulley 42.

An important feature of the present invention is found in the inclined roller 59, arranged between the strips of the twisted belt for reducing friction between the parts of the belt and preventing endwise shifting of the belt on its pulleys, which might otherwise occur due to variation in the twisting of the belt when the trailer frame tilts to different positions with relation to the frame of the main machine.

It should perhaps be stated that the spindle 49 has in its wall lubricant passages 60 through which oil or grease may pass from the interior of the spindle to the hubs of the pulley members 52.

It will be obvious from the foregoing that my improved flexible belt power take-off may be used in a great variety of environments other than that illustrated here, and it is my intention to cover by the claims of the patent issued upon this application any modified forms of the device, which may be included within their scope.

I claim as my invention:

1. In a device of the class described, the combination of a power plant having a casing enclosed shaft, a belt pulley assembly comprising a shaft, a sleeve mounted on said shaft having a plate projecting therefrom and connected with the casing of the power plant, said shafts being operatively connected, a belt pulley on said second shaft, having a web and a sleeve-like hub terminating at one end close to the web and projecting from the web at its other end to form a long bearing, said sleeve projecting substantially into the belt pulley adjacent to the short end of the hub, for eliminating the necessity of an outer bearing.

2. In a structure of the class described, the combination of a frame supported operative mechanism mounted for transportation with a trailer having a frame mounted for transportation pivoted to the frame of the first described mechanism, shafts on the respective frames, pulleys on said shafts, a twisted belt traveling on said pulleys and a belt tightener comprising a member mounted for adjustment on the first frame, a spindle mounted in said member, and a belt tightener pulley comprising a pair of single flanged pulley members mounted on said spindle, and a washer between said pulley members, whereby the width of the belt tightener pulley may be varied by varying the width of the washer.

3. A pulley assembly comprising a spindle, collars adjustably mounted thereon, a pair of single flanged pulley members mounted on said spindle, and a washer between said pulley members.

4. A pulley assembly comprising a tubular spindle, collars adjustably mounted thereon, a pair of single flanged pulley members mounted on said spindle, a washer between the pulley members, a removable plug in the end of said spindle, the spindle being provided with lubricant passages through its wall.

5. In a device of the class described, the combination of a wheel-supported frame and operative mechanism, with a wheel-mounted trailer having a frame pivoted to said first frame, a power plant on the trailer including a shaft, a pulley mounted on the first frame, a twisted belt traveling on said pulleys in a plane lengthwise to the axes of said mechanism and trailer, and an inclined roller supported on the frame of the trailer and projected between the stretches of the belt for preventing friction between the parts of the belt and for holding the belt against shifting on its pulleys when the frame of the trailer tilts with relation to the frame of said mechanism.

SAMUEL E. KURTZ.